(12) United States Patent
Jones-McFadden et al.

(10) Patent No.: US 9,820,148 B2
(45) Date of Patent: Nov. 14, 2017

(54) PERMANENTLY AFFIXED UN-DECRYPTABLE IDENTIFIER ASSOCIATED WITH MOBILE DEVICE

(71) Applicant: BANK OF AMERICA CORPORATION, Charlotte, NC (US)

(72) Inventors: Alicia C. Jones-McFadden, Fort Mill, SC (US); Elizabeth S. Votaw, Potomac, MD (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 231 days.

(21) Appl. No.: 14/928,161

(22) Filed: Oct. 30, 2015

(65) Prior Publication Data

US 2017/0126639 A1    May 4, 2017

(51) Int. Cl.
| | |
|---|---|
| H04W 12/06 | (2009.01) |
| H04W 4/02 | (2009.01) |
| H04L 29/06 | (2006.01) |
| H04W 12/12 | (2009.01) |
| H04W 64/00 | (2009.01) |

(52) U.S. Cl.
CPC ......... *H04W 12/06* (2013.01); *H04L 63/0876* (2013.01); *H04W 4/02* (2013.01); *H04W 12/12* (2013.01); *H04W 64/00* (2013.01)

(58) Field of Classification Search
None
See application file for complete search history.

(56) References Cited

U.S. PATENT DOCUMENTS

| | | | |
|---|---|---|---|
| 3,256,670 | A | 6/1966 | Tersigni |
| 3,651,168 | A | 3/1972 | Stoessel et al. |
| 5,437,346 | A | 8/1995 | Dumont |
| 6,256,670 | B1 | 7/2001 | Davies |
| 6,651,168 | B1 | 11/2003 | Kao et al. |
| 7,111,323 | B1 | 9/2006 | Bhatia et al. |
| 7,231,202 | B2 | 6/2007 | Natsuno |
| 7,239,226 | B2 | 7/2007 | Berardi et al. |

(Continued)

OTHER PUBLICATIONS

QThru.com. "QThru: use your mobile smartphone for self-checkout." http://www http://www.qthru.com/. QThru.com 2011. 6 pages. Retrieved Mar. 22, 2013.

(Continued)

*Primary Examiner* — Kaveh Abrishamkar
(74) *Attorney, Agent, or Firm* — Michael A. Springs; Moore & Van Allen PLLC; Nicholas C. Russell

(57) ABSTRACT

Embodiments of the invention are directed to a system, method, or computer program product for providing a permanently affixed un-decryptable coded identifier onto a mobile device. The identifier may be one or more applications, pictures, widgets, tokens, or the like that may be transformed into an identifier to include the objects original functionality plus additional coding. The identifier, once selected by the user may be coded to include a tracker, beacon, and coded with remote access abilities. The identifier may then be permanently installed onto the user's mobile device. As such providing a trackable code associated with a mobile device, if the mobile device is misplaced. Furthermore, the identifier may be permanently stored within the mobile device preventing complete erasing of the identifier upon complete data deletion of the user device.

20 Claims, 5 Drawing Sheets

(56) References Cited

U.S. PATENT DOCUMENTS

| | | |
|---|---|---|
| 7,373,515 B2 | 5/2008 | Owen et al. |
| 7,472,081 B1 | 12/2008 | Cason |
| 7,529,741 B2 | 5/2009 | Aravamudan et al. |
| 7,546,276 B2 | 6/2009 | Randle et al. |
| 7,599,287 B2 | 10/2009 | Testa et al. |
| 7,627,505 B2 | 12/2009 | Yoshida et al. |
| 7,693,771 B1 | 4/2010 | Zimmerman et al. |
| 7,697,920 B1 | 4/2010 | McClain |
| 7,698,443 B2 | 4/2010 | Yaffe et al. |
| 7,716,180 B2 | 5/2010 | Vermeulen et al. |
| 7,738,382 B2 | 6/2010 | Le Faucheur et al. |
| 7,783,281 B1 | 8/2010 | Cook et al. |
| 7,930,264 B2 | 4/2011 | Geppert |
| 7,988,045 B2 | 8/2011 | Connell, II et al. |
| 8,012,219 B2 | 9/2011 | Mendez et al. |
| 8,156,335 B2 | 4/2012 | Lin |
| 8,165,945 B2 | 4/2012 | Collins et al. |
| 8,201,232 B2 | 6/2012 | Zhang et al. |
| 8,214,650 B2 | 7/2012 | Dickinson et al. |
| 8,244,210 B2 | 8/2012 | Ayanamcottil et al. |
| 8,261,093 B1 | 9/2012 | Dhesi et al. |
| 8,270,995 B1 | 9/2012 | Manroa et al. |
| 8,286,227 B1 | 10/2012 | Zheng |
| 8,295,812 B1 | 10/2012 | Jones |
| 8,295,898 B2 | 10/2012 | Ashfield et al. |
| 8,307,412 B2 | 11/2012 | Ozzie et al. |
| 8,332,272 B2 | 12/2012 | Fisher |
| 8,352,323 B2 | 1/2013 | Fisher |
| 8,352,730 B2 | 1/2013 | Giobbi |
| 8,369,833 B2 | 2/2013 | McClain |
| 8,380,177 B2 | 2/2013 | Laracey |
| 8,412,626 B2 | 4/2013 | Hirson et al. |
| 8,423,466 B2 | 4/2013 | Lanc |
| 8,442,915 B2 | 5/2013 | Takatori et al. |
| 8,483,194 B1 | 7/2013 | Wu et al. |
| 8,483,663 B1 | 7/2013 | Jones |
| 8,485,438 B2 | 7/2013 | Dollard |
| 8,601,602 B1 | 12/2013 | Zheng |
| 8,644,506 B2 | 2/2014 | Zellner |
| 8,660,358 B1 | 2/2014 | Bergboer et al. |
| 8,682,802 B1 | 3/2014 | Kannanari |
| 8,683,571 B2 | 3/2014 | Zapata et al. |
| 8,744,968 B1 | 6/2014 | Grigg et al. |
| 8,768,838 B1 | 7/2014 | Hoffman |
| 8,769,270 B2 | 7/2014 | Orsini et al. |
| 8,850,575 B1 | 9/2014 | Magi Shaashua et al. |
| 8,869,241 B2 | 10/2014 | Davis et al. |
| 8,869,305 B1 | 10/2014 | Huang |
| 8,881,306 B2 | 11/2014 | Feldman et al. |
| 8,930,271 B1 | 1/2015 | Ellis et al. |
| 8,973,102 B2 | 3/2015 | Jakobsson |
| 2001/0049711 A1 | 12/2001 | Nishihara |
| 2002/0077978 A1 | 6/2002 | O'Leary et al. |
| 2002/0111907 A1 | 8/2002 | Ling |
| 2002/0157029 A1 | 10/2002 | French et al. |
| 2002/0174073 A1 | 11/2002 | Nordman et al. |
| 2002/0186845 A1 | 12/2002 | Dutta et al. |
| 2003/0045328 A1 | 3/2003 | Natsuno |
| 2003/0065805 A1 | 4/2003 | Barnes, Jr. |
| 2006/0030333 A1 | 2/2006 | Ward et al. |
| 2006/0036868 A1 | 2/2006 | Cicchitto |
| 2006/0223518 A1* | 10/2006 | Haney .................. H04W 4/08 455/420 |
| 2007/0055594 A1 | 3/2007 | Rivest et al. |
| 2007/0094152 A1 | 4/2007 | Bauman et al. |
| 2007/0100773 A1 | 5/2007 | Wallach |
| 2007/0113275 A1 | 5/2007 | Khanna et al. |
| 2007/0156842 A1 | 7/2007 | Vermeulen et al. |
| 2007/0168677 A1 | 7/2007 | Kudo et al. |
| 2007/0194884 A1 | 8/2007 | Didier et al. |
| 2007/0219984 A1 | 9/2007 | Aravamudan et al. |
| 2007/0250920 A1 | 10/2007 | Lindsay |
| 2007/0277232 A1 | 11/2007 | Cates et al. |
| 2008/0167965 A1 | 7/2008 | Von Nothaus et al. |
| 2008/0293397 A1 | 11/2008 | Gajdos et al. |
| 2008/0319889 A1 | 12/2008 | Hammad |
| 2009/0019534 A1 | 1/2009 | Bakshi et al. |
| 2009/0076965 A1 | 3/2009 | Elson et al. |
| 2009/0100529 A1 | 4/2009 | Livnat et al. |
| 2009/0150286 A1 | 6/2009 | Barton |
| 2009/0187492 A1 | 7/2009 | Hammad et al. |
| 2009/0199264 A1 | 8/2009 | Lang |
| 2009/0217346 A1 | 8/2009 | Manring et al. |
| 2009/0254975 A1 | 10/2009 | Turnbull et al. |
| 2010/0016001 A1 | 1/2010 | Yang |
| 2010/0039266 A1* | 2/2010 | Faris .................. G08B 21/24 340/572.4 |
| 2010/0048167 A1 | 2/2010 | Chow |
| 2010/0064345 A1 | 3/2010 | Bentley et al. |
| 2010/0100897 A1 | 4/2010 | Manuel-Devadoss |
| 2010/0122333 A1 | 5/2010 | Noe |
| 2010/0330958 A1 | 12/2010 | Corda et al. |
| 2011/0016534 A1 | 1/2011 | Jakobsson et al. |
| 2011/0099104 A1 | 4/2011 | Nybom |
| 2011/0137804 A1 | 6/2011 | Peterson |
| 2011/0142234 A1 | 6/2011 | Rogers |
| 2011/0159846 A1 | 6/2011 | Kemshall |
| 2011/0166992 A1 | 7/2011 | Dessert et al. |
| 2011/0167440 A1 | 7/2011 | Greenfield |
| 2011/0208601 A1 | 8/2011 | Ferguson et al. |
| 2011/0252446 A1* | 10/2011 | Jeong .................. H04N 21/4312 725/40 |
| 2011/0270618 A1 | 11/2011 | Banerjee et al. |
| 2011/0320296 A1 | 12/2011 | Edwards |
| 2012/0030109 A1 | 2/2012 | Dooley Maley et al. |
| 2012/0054057 A1 | 3/2012 | O'Connell et al. |
| 2012/0089514 A1 | 4/2012 | Kraemling et al. |
| 2012/0095916 A1 | 4/2012 | Dorsey et al. |
| 2012/0120880 A1 | 5/2012 | Lee et al. |
| 2012/0137340 A1 | 5/2012 | Jakobsson et al. |
| 2012/0144468 A1 | 6/2012 | Pratt et al. |
| 2012/0160912 A1 | 6/2012 | Laracey |
| 2012/0171237 A1 | 7/2012 | Ching et al. |
| 2012/0173551 A1 | 7/2012 | Haddorp et al. |
| 2012/0174237 A1 | 7/2012 | Krzyzanowski |
| 2012/0197743 A1 | 8/2012 | Grigg et al. |
| 2012/0197794 A1 | 8/2012 | Grigg et al. |
| 2012/0230539 A1 | 9/2012 | Calman et al. |
| 2012/0239576 A1 | 9/2012 | Rose et al. |
| 2012/0254941 A1 | 10/2012 | Levien et al. |
| 2012/0254943 A1 | 10/2012 | Li |
| 2012/0265585 A1 | 10/2012 | Muirbrook et al. |
| 2012/0300938 A1 | 11/2012 | Kean et al. |
| 2012/0316963 A1 | 12/2012 | Moshfeghi |
| 2013/0007874 A1 | 1/2013 | Purvis |
| 2013/0013498 A1 | 1/2013 | Fisher et al. |
| 2013/0030882 A1 | 1/2013 | Davis, III et al. |
| 2013/0030931 A1 | 1/2013 | Moshfeghi |
| 2013/0031003 A1 | 1/2013 | Dorsey et al. |
| 2013/0031004 A1 | 1/2013 | Dorsey et al. |
| 2013/0042314 A1 | 2/2013 | Kelley |
| 2013/0085927 A1 | 4/2013 | Scott |
| 2013/0097682 A1 | 4/2013 | Zeljkovic et al. |
| 2013/0097683 A1 | 4/2013 | Davis et al. |
| 2013/0097684 A1 | 4/2013 | Kim |
| 2013/0102283 A1 | 4/2013 | Lau et al. |
| 2013/0111208 A1 | 5/2013 | Sabin et al. |
| 2013/0143621 A1 | 6/2013 | Kumaran |
| 2013/0160100 A1 | 6/2013 | Langley |
| 2013/0167207 A1 | 6/2013 | Davis et al. |
| 2013/0173456 A1 | 7/2013 | Grigg et al. |
| 2013/0178233 A1 | 7/2013 | McCoy et al. |
| 2013/0179954 A1 | 7/2013 | Bidare |
| 2013/0188485 A1 | 7/2013 | Midani et al. |
| 2013/0198056 A1 | 8/2013 | Aldrey et al. |
| 2013/0212007 A1 | 8/2013 | Mattsson et al. |
| 2013/0219454 A1 | 8/2013 | Hewinson |
| 2013/0267204 A1 | 10/2013 | Schultz et al. |
| 2013/0290361 A1 | 10/2013 | Anderson et al. |
| 2014/0129357 A1 | 5/2014 | Goodwin |
| 2014/0130127 A1 | 5/2014 | Toole et al. |
| 2014/0172707 A1 | 6/2014 | Kuntagod et al. |
| 2014/0173704 A1 | 6/2014 | Adams et al. |
| 2014/0208401 A1 | 7/2014 | Balakrishnan et al. |

(56) References Cited

U.S. PATENT DOCUMENTS

| | | |
|---|---|---|
| 2014/0244503 A1 | 8/2014 | Sadlier |
| 2014/0245391 A1 | 8/2014 | Adenuga |
| 2014/0250009 A1 | 9/2014 | Carlson |
| 2014/0273948 A1* | 9/2014 | Ramprasad .......... H04L 12/1403 455/408 |
| 2014/0279270 A1 | 9/2014 | Bertanzetti et al. |
| 2014/0279476 A1 | 9/2014 | Hua |
| 2014/0289821 A1 | 9/2014 | Wilson |
| 2014/0310764 A1 | 10/2014 | Tippett et al. |
| 2014/0315159 A1 | 10/2014 | Mukherjee et al. |
| 2014/0372743 A1* | 12/2014 | Rogers .................. H04L 9/3234 713/2 |
| 2015/0032621 A1 | 1/2015 | Kar et al. |
| 2015/0039601 A1 | 2/2015 | Harrang et al. |
| 2015/0120572 A1 | 4/2015 | Slade |
| 2015/0161610 A1 | 6/2015 | Sahadevan et al. |
| 2015/0171049 A1 | 6/2015 | Wasserman et al. |
| 2015/0213474 A1 | 7/2015 | Howe |
| 2017/0126639 A1* | 5/2017 | Jones-McFadden .... H04W 4/02 |
| 2017/0199805 A1* | 7/2017 | Cotugno ............... H04W 4/003 |

OTHER PUBLICATIONS

Tode, Chantal. "Walmart speeds up checkout, lets shoppers scan items via iPhone." Published Sep. Published Sep. 5, 2012. http://www.mobilecommercedaily.com/walmart-speeds-up-checkout-lets-shoppers-scan-items-themselves-via-iphone. Mobile Commerce Daily. 4 pages. Retrieved Mar. 22, 2013.

RISNews.edgl.com. "Supermarket Retailer Rolls Out Self-Checkout Smartphone App." http://risnews.ed http://risnews.edgl.com/retail-news/Supermarket-Retailer-Rolls-Out-Self-Checkout-Smartphone-App81027 2 pages. Retrieved Mar. 9, 2013.

Zimmerman, Ann. "Check Out the Future of Shopping: Shaving Time Off the Weekly Grocery Run to Keep Consumers in Stores and Spending." http://online.w http://online.wsj.com/article/SB10001424052748703421204576329253050637400.html. 5 pages. Retrieved Mar. 22, 2013.

Office Action dated Aug. 27, 2015 for U.S. Appl. No. 14/175,701.

* cited by examiner

PERMANENTLY AFFIXED UN-DECRYPTABLE IDENTIFIER ASSOCIATED WITH MOBILE DEVICE

BACKGROUND

Advancements in technology have made mobile devices with multi-faceted functionality available to large numbers of individuals. With the continued addition of new functions to these mobile devices, more and more information about the individuals that own the device is being carried on the mobile device.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing apparatuses (e.g., a system, computer program product and/or other devices) and methods for providing a permanently affixed un-decryptable identifier onto a mobile device. In this way, the owner or user of a mobile device may select one or more applications, pictures, widgets, tokens, or the like that may be transformed into an identifier. The identifier, once selected by the user may be coded to include a tracker, beacon, and coded with remote access abilities. The indicator may then be permanently installed onto the user's mobile device.

In this way, if a mobile device is ever misappropriated, misplaced, or the like, the identifier is still present within the device. As such, if the data on the misappropriated mobile device is ever erased, the identifier may remain. Thus preventing complete erasing of data from a mobile device. Furthermore, once the user identifies that the mobile device is misplaced, the user may activate the beacon function associated with the identifier and be able to track the location of the mobile device based on the beacon.

In some embodiments, the invention may select and keep one application, picture, widget, token, or the like that provides a unique identification that it is the user's mobile device. As such, misappropriation, such as complete deletion of the contents of a user's phone or complete replication of a user's phone, cannot be completed because the identifier is permanently affixed to the device and cannot be decrypted. Furthermore, after a device is determined to be lost or misappropriated, the identifier may be remotely accessed and generate a beacon for finding the misappropriated device.

Embodiments of the invention relate to systems, methods, and computer program products for creating and storing an un-decryptable identifier on a mobile device, the invention comprising: receiving a request and authorization from a user to generate the identifier on the mobile device of the user; presenting one or more objects to the user that can be coded as the identifier, wherein the one or more objects presented have an original function associated with each of the one or more objects; receiving a selected object from the user, wherein the selected object is selected to be the identifier; coding the selected object with an un-decryptable code, a beacon code, and a remote deletion code to become the identifier, wherein the un-decryptable code allow the identifier to be maintained on the mobile device after a complete wipe out, deletion, or clearing of all the data on the mobile device, wherein coding the selected object further comprises maintaining the original function of the selected object in addition to the un-decryptable code, the beacon code, and the remote deletion code; transmitting the identifier to the mobile device associated with the user; storing, upon user authorization, the identifier on the mobile device, wherein storing further comprises integrating the identifier into storage with like objects; identifying misplacement or misappropriation of the mobile device; and activating, based on identifying the misplacement or the misappropriation of the mobile device, the beacon code for identifying a location of the mobile device.

In some embodiments, the beacon code comprises a location beacon that creates a secure communicable link to transmit a location of the mobile device, wherein the beacon code is activated upon an identification of an attempted deletion of the identifier. In some embodiments, the remote deletion code comprises code that allows the user to connect remotely to the mobile device and allows for remote deletion one or more personal items from the mobile device.

In some embodiments, identifying misplacement or misappropriation of the mobile device further comprises automatically identifying misplacement of the mobile device based on inactivity of the identifier and automatically identifying misappropriation of the mobile device by identifying an attempt to delete the identifier.

In some embodiments, the one or more objects that can be coded as the identifier include applications, widgets, pictures, or contacts associated with the mobile device of the user.

In some embodiments, the invention further comprises accessing the mobile device of the user and extracting applications, widgets, pictures, and contacts that can be coded as the identifier.

In some embodiments, storing the identifier on the mobile device further comprises permanently affixing the identifier on the mobile device, wherein storing further comprises integrating the identifier into storage with like objects on the mobile device.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
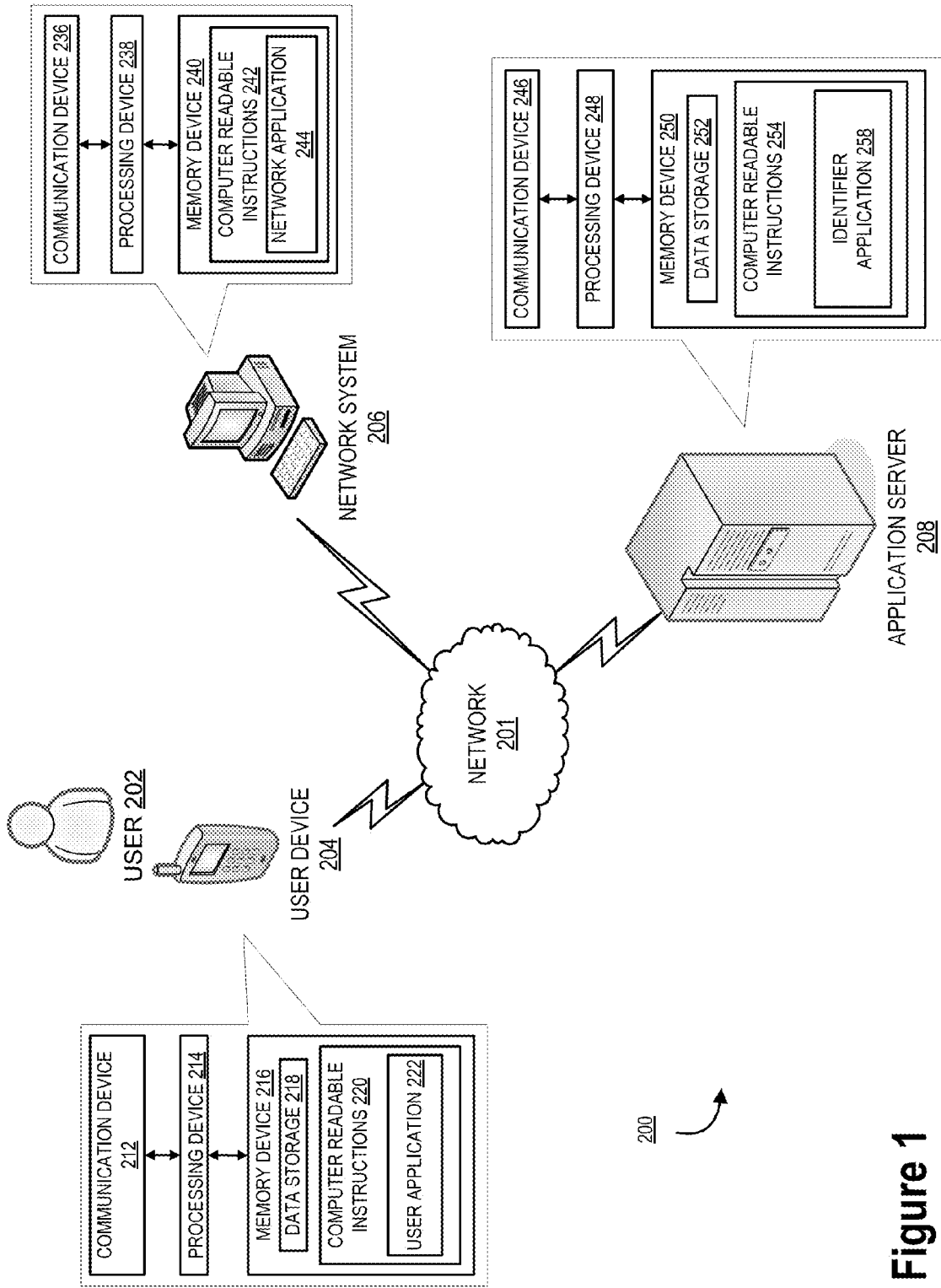
Figure 2:
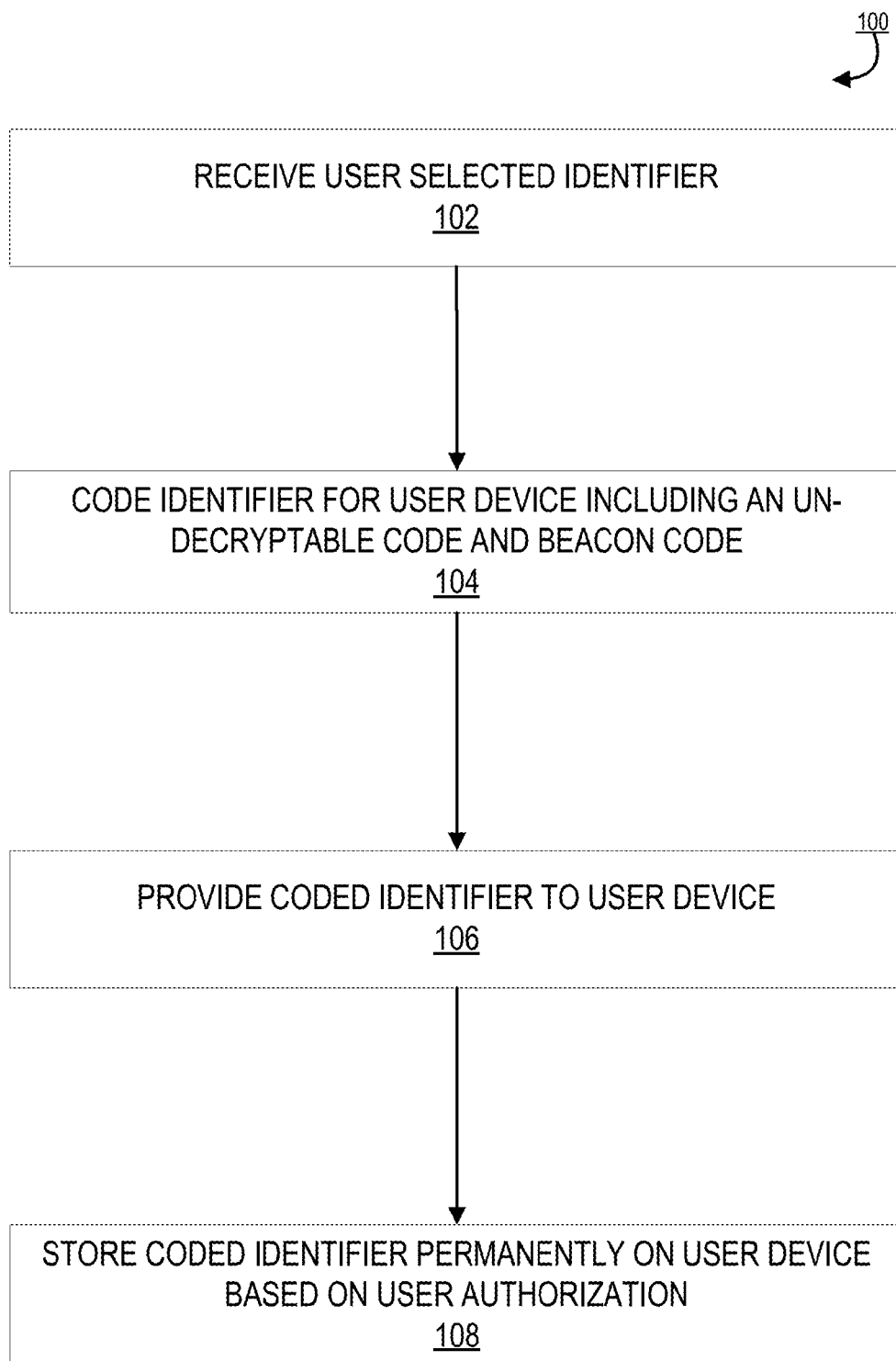
Figure 3:
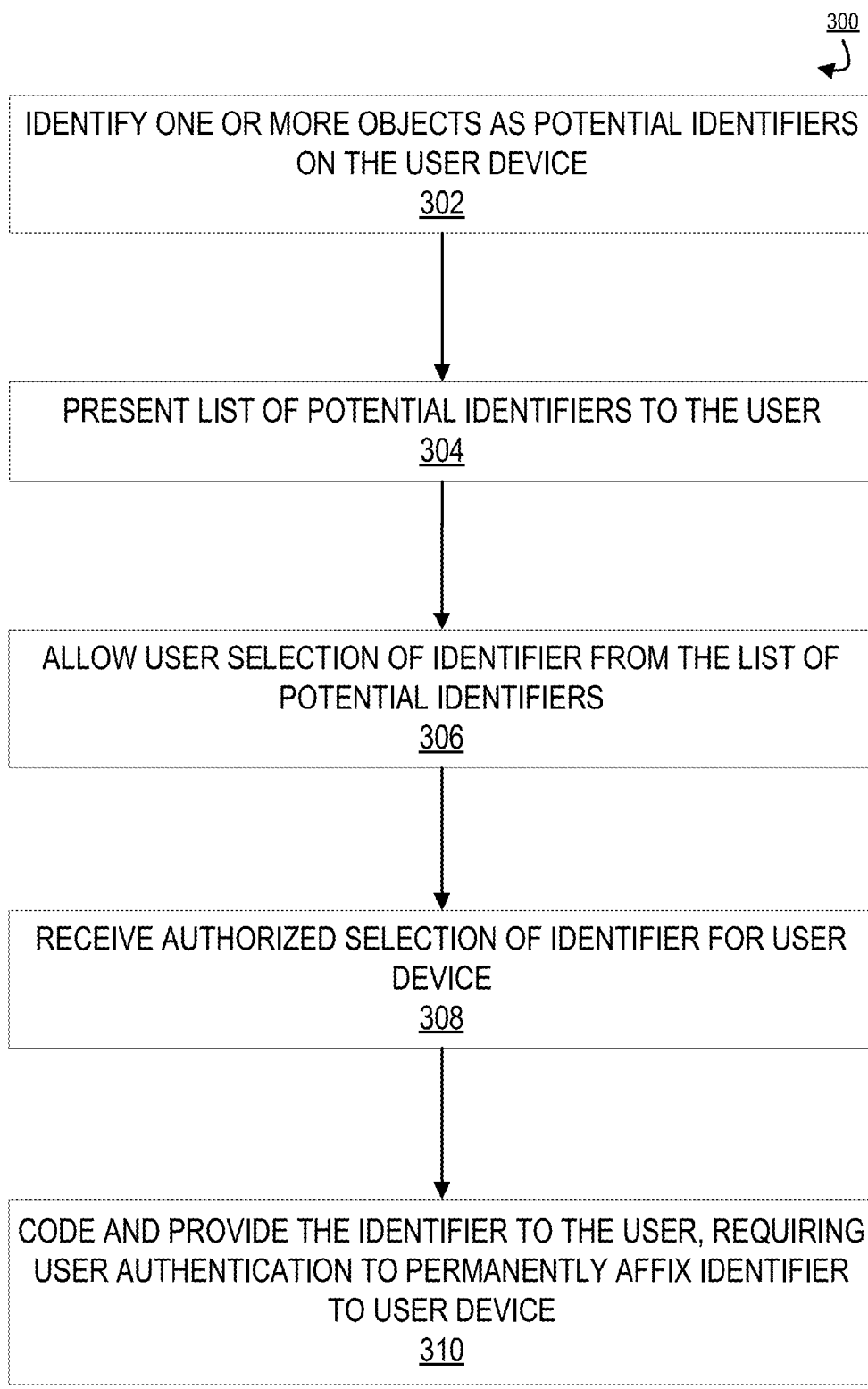
Figure 4:
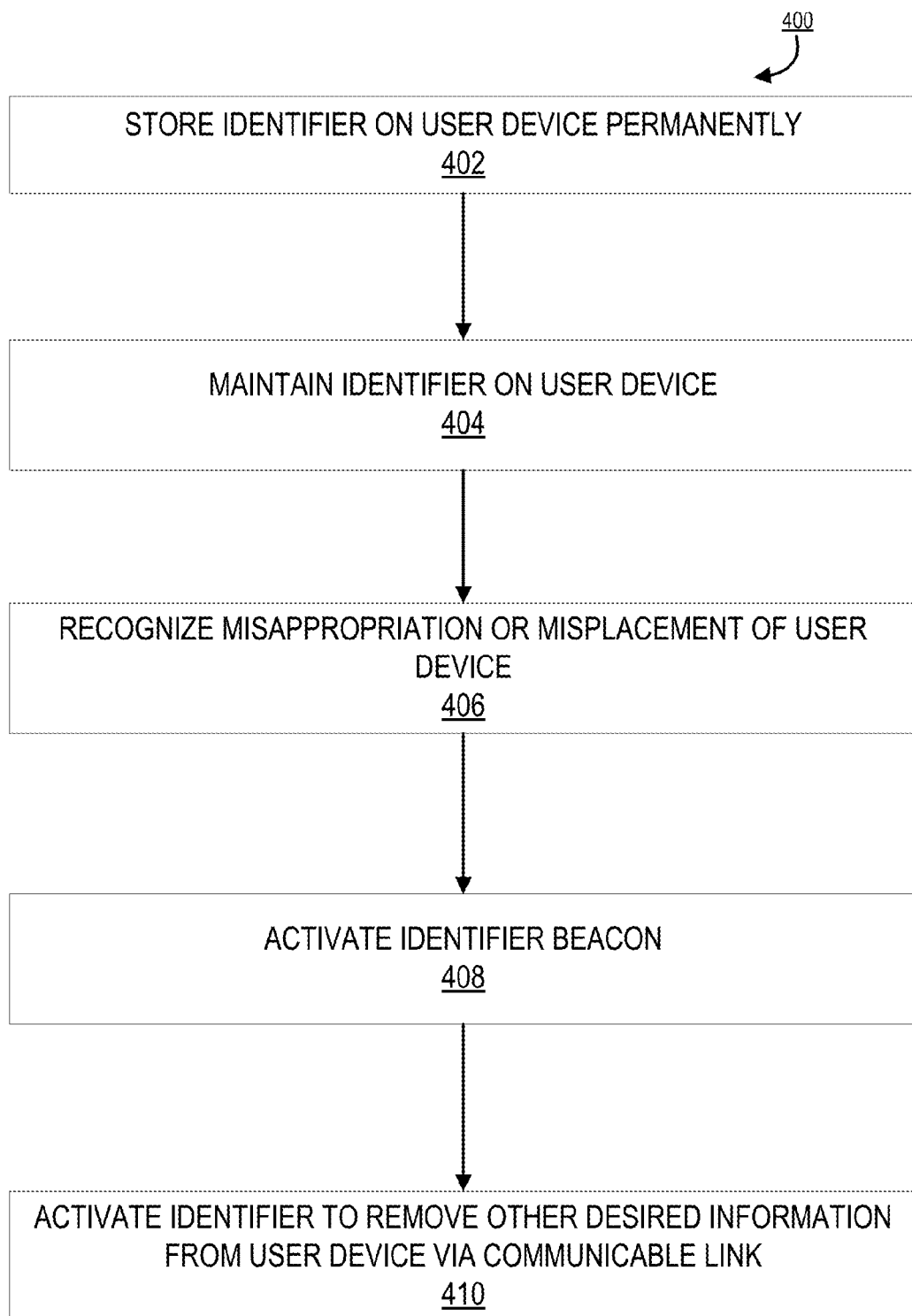
Figure 5:
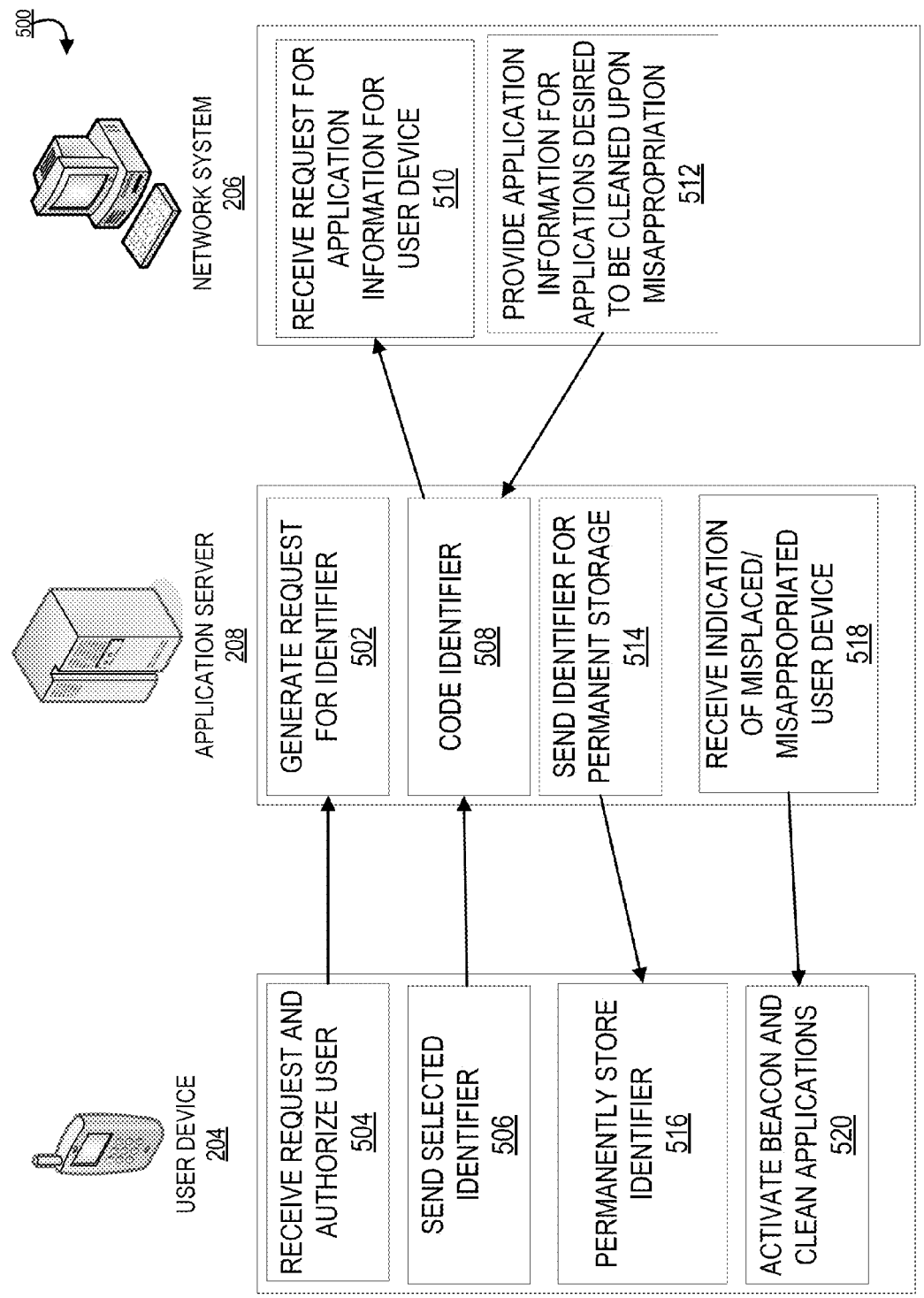

Having thus described embodiments of the invention in general terms, reference will now be made to the accompanying drawings, wherein:

FIG. 1 provides an un-decryptable identifier system environment, in accordance with one embodiment of the present invention;

FIG. 2 provides a high level process flow illustrating the permanent affixing of the identifier to a mobile device, in accordance with one embodiment of the present invention;

FIG. 3 provides a process map illustrating identifying and coding an identifier, in accordance with one embodiment of the present invention;

FIG. 4 provides a process map illustrating the storing and activating of the identifier on a mobile device, in accordance with one embodiment of the present invention; and FIG. 5 provides a detailed system process flow illustrating data flow of the un-decryptable identifier system, in accordance with one embodiment of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

Furthermore, as used herein the term "user device" may refer to mobile phones, personal computing devices, tablet computers, wearable devices, and/or any electronic device capable of receiving and/or storing data therein.

With advancements in technology infrastructures and wireless communication implementation, portable multi-function devices, such as laptop computers, tablet computers, mobile phones and the like are common. Typically, individuals may have a user device on them when in public. These devices have the capability to hold large amounts of information, including personal information. Misappropriation of these devices may cause the transfer of personal information from one individual to another. Furthermore, upon wiping out or clearing of the data on the device, it may be re-programmed for a different individual. As such, a misappropriated device may need to be replaced by the user.

Embodiments of the present invention address the above needs and/or achieve other advantages by providing apparatuses (e.g., a system, computer program product and/or other devices) and methods for providing a permanently affixed un-decryptable identifier onto a mobile device. In this way, the owner or user of a mobile device may select one or more applications, pictures, widgets, tokens, or the like that may be transformed into an identifier. The identifier, once selected by the user may be coded to include a tracker, beacon, and coded with remote access abilities. The indicator may then be permanently installed onto the user's mobile device.

In this way, if a mobile device is ever misappropriated, misplaced, or the like, the identifier is still present within the device. As such, if the data on the misappropriated mobile device is ever erased, the identifier may remain. Thus preventing complete erasing of data from a mobile device. Furthermore, once the user identifies that the mobile device is misplaced, the user may activate the beacon function associated with the identifier and be able to track the location of the mobile device based on the beacon.

Embodiments of the invention are directed to a system, method, or computer program product for a distributive network system with specialized data feeds associated with the distributive network and specific triggering events associated with the data feeds for coding and generating an un-decryptable identifier in the form of a picture, widget, contact, or the like onto a mobile device of the user for permanent fixation onto the device. Thus, the invention system may code a beacon or tracker to identify a location of a user device if misappropriated preventing further misappropriation of the device.

FIG. 1 illustrates an un-decryptable identifier system environment, in accordance with one embodiment of the present invention 200, in accordance with one embodiment of the present invention. FIG. 1 provides the system environment 200 for which the distributive network system with specialized data feeds associated with the distributive network and specific triggering events associated with the data feeds for permanently affixing an un-decryptable coded identifier to the user device for subsequent beacon activation and private information deletion.

FIG. 1 provides a unique system that includes specialized servers and system communicably linked across a distributive network of nodes required to perform the functions of coding, permanently inserting, and activating a unique identifier on the user device. Furthermore, in some embodiments, the system may be, as described below, run on a diffusion network of specialized nodes meant for integration and activation of an identifier.

As illustrated in FIG. 1, the application server 208 is operatively coupled, via a network 201 to the user system 204, and to the network system 206. In this way, the application server 208 can send information to and receive information from the user device 204 and the network system 206. FIG. 2 illustrates only one example of an embodiment of the system environment 200, and it will be appreciated that in other embodiments one or more of the systems, devices, or servers may be combined into a single system, device, or server, or be made up of multiple systems, devices, or servers.

The network 201 may be a system specific distributive network receiving and distributing specific network feeds and identifying specific network associated triggers. The network 201 may also be a global area network (GAN), such as the Internet, a wide area network (WAN), a local area network (LAN), or any other type of network or combination of networks. The network 201 may provide for wireline, wireless, or a combination wireline and wireless communication between devices on the network 201.

In some embodiments, the user 202 is an individual that has a user device, such as a mobile phone, tablet, or the like. FIG. 1 also illustrates a user system 204. The user device 204 may be, for example, a desktop personal computer, a mobile system, such as a cellular phone, smart phone, personal data assistant (PDA), laptop, or the like. The user device 204 generally comprises a communication device 212, a processing device 214, and a memory device 216. The user device 204 is a computing system that allows a user 202 to interact through the network 201 with the application server 208 to request an identifier, authorize the storage of the identifier on the user device 204, and to activate the identifier. The processing device 214 is operatively coupled to the communication device 212 and the memory device 216. The processing device 214 uses the communication device 212 to communicate with the network 201 and other devices on the network 201, such as, but not limited to the network system 206 and the application server 208. As such, the communication device 212 generally comprises a modem, server, or other device for communicating with other devices on the network 201.

The user device 204 comprises computer-readable instructions 220 and data storage 218 stored in the memory device 216, which in one embodiment includes the computer-readable instructions 220 of a user application 222. In this way, a user 202 may request or select an identifier, authorize the storage of the identifier on the user device 204, and activate the identifier.

In some embodiments, the user application 222 allows a user 202 to request or select an identifier. In this way, the application server 208 may provide the user 202, via the user device, with one or more options for the identifier. In some embodiments, the user 202 may provide an option for the identifier. These options may include an application, widget, picture, contact, video, meme, or the like that may be used as an identifier. In some embodiments, the application, widget, picture, contact, video, meme, or the like may already be on the user device 204 stored in the memory device 216. In some embodiments, the application, widget, picture, contact, video, meme, or the like may be taken or downloaded by the user 202 via the user device 204. In yet other embodiments, the application, widget, picture, contact, video, meme, or the like may be provided to the user by the system. The user 202 may select either an application server 208 presented option or a user 202 provided option for the identifier via an interface presented to the user 202 via the user device 204.

In some embodiments, the user application 222 allows a user 202 to authorize storage of a coded identifier. Once coded, the application server 208 may provide the coded identifier to the user application 222 via the network 201. Once provided, the user application 222 may integrate and store the identifier on the user device 204 permanently affixing the identifier into the user device 204. The stored coded identifier is permanently affixed to the user device 204 based on an authorization of storage by the user 202. The identifier may be stored and integrated into the memory 214 of the user device 204. As such, if the identifier is a picture, it may be stored with the user's photos. Likewise, if the identifier is an application or widget, the identifier may be stored with the widgets and/or applications. Furthermore, the coded identifier may still perform the functions originally provided by the identifier. Thus, for example, if the identifier is an application for playing music, once that identifier has been coded by the system and presented back on the user device for permanent storage, the identifier may still perform the functionality of the application, such that it may still play music in the same or similar way it did prior to being coded by the application server 208.

In some embodiments, the user application 222 allows a user 202 to remotely activate the identifier. In this way, in some embodiments, the user 202 may initiate the activation of the identifier beacon. As such, the user 202 may activate the beacon remotely via secure communicable link to the user device 204 which has been misplaced or misappropriated. The user 202 may provide a passcode, number, or other identification type that may transmit a signal to the user application 222 to activate the beacon on the identifier. Furthermore, through the secure communicable link the user 202 may be able to activate code on the identifier via the user application 222 to remove other desired information for the user device 204. In this way, if the user 202 has one or more contacts, applications, passwords, or the like that he/she wishes to remain private after misappropriation or misplacement of the user device 204, the activation of the identifier may allow for the user 202 to erase or delete this private information from the user device 204 remotely.

As further illustrated in FIG. 1, the application server 208 generally comprises a communication device 246, a processing device 248, and a memory device 250. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 248 is operatively coupled to the communication device 246 and the memory device 250. The processing device 248 uses the communication device 246 to communicate with the network 201 and other devices on the network 201, such as, but not limited to the network system 206 and the user system 204. As such, the communication device 246 generally comprises a modem, server, or other device for communicating with other devices on the network 201.

As further illustrated in FIG. 1, the application server 208 comprises computer-readable instructions 254 stored in the memory device 250, which in one embodiment includes the computer-readable instructions 254 of an identifier application 258. In some embodiments, the memory device 250 includes data storage 252 for storing data related to the system environment, but not limited to data created and/or used by the identifier application 258.

In the embodiment illustrated in FIG. 1 and described throughout much of this specification, the identifier application 258 may identify objects as identifiers, code selected objects, send and store the identifier at the user device 204, and initiate activation of beacon and/or other identifier activation.

In some embodiments, the identifier application 258 may identify objects as identifiers. In this way, the identifier application 258 may identify and provide the user 202, via the network 201, with one or more options for the identifier. These options may include an application, widget, picture, contact, video, meme, or the like that may be used as an identifier. In some embodiments, the application, widget, picture, contact, video, meme, or the like may be extracted by the identifier application 258 from the user device 204. In some embodiments, the application, widget, picture, contact, video, meme, or the like may be provided to the user 202 by the identifier application 258.

In some embodiments, the identifier application 258 may code selected objects. In this way, the identifier application 258 may, once the identifier is received from an authorized user 202, continue by coding the identifier. The coding of the identifier for the user device 204 includes coding for an un-decryptable code, a beacon code, and a remote deletion code. The un-decryptable code may allow the identifier to be maintained on the user device 204 even after a complete wipe out, deletion, or clearing of all the data on the device. However, the un-decryptable code may be altered, changed, or deleted by the user or the system upon authorization by the user. The beacon code may include a secure communicable link generated via the code to transmit a location of the user device upon request or automatically based on an identification of deletion of data on the user device. The remote deletion code may allow a user 202 to connect remotely to the user device 204 and remotely delete one or more personal items on the user device 204.

In some embodiments, the identifier application 258 may send and store the identifier at the user device 204. The identifier application 258 may send the coded identifier via a secure communicable link created with the user device 204.

In some embodiments, the identifier application 258 may initiate activation of beacon and/or other identifier activation. In this way, the identifier application 258 may recognize misappropriation or a misplacement of the user device 204. In some embodiments, the identifier application 258 may automatically identify the misappropriation based on an invalid attempt to delete or erase the identifier from the user device 204.

Once the misappropriation or misplacement of the user device has been identified, the identifier application 258 may continue by activating the identifier beacon. In some embodiments, the user 202 may initiate the activation of the identifier beacon. As such, the user may activate the beacon remotely via secure communicable link. The user 202 may provide a passcode, number, or other identification type that may transmit a signal to the identifier to activate the beacon. In other embodiments, the identifier application 258 may activate the beacon associated with the identifier. The identifier application 258 may activate the beacon associated with the identifier based on a recognition that there was an attempted deletion of the identifier without user 202 or system authorization. In some embodiments, the identifier application 258 may activate the beacon based on an identification of changing of the applications or contacts associated with the device. In yet other embodiments, the identifier application 258 may activate the beacon based on global positioning system information associated with the device. The beacon provides a location of the user device 204. The location may be utilized by the user 202 to retrieve the user device 204.

Furthermore, the identifier application 258 may also allow for activation of the deletion code to remove other desired information for the user device 204 via the secure communicable link. In this way, if the user 202 has one or more contacts, applications, passwords, or the like that he/she wishes to remain private after misappropriation or misplacement of the user device 204, the activation of the identifier may allow for the user 202 to erase or delete this private information from the device remotely.

As illustrated in FIG. 1, the network system 206 is connected to the application server 208 and is associated with a mobile device network. In this way, while only one network system 206 is illustrated in FIG. 1, it is understood that multiple network systems may make up the system environment 200. The network system 206 generally comprises a communication device 236, a processing device 238, and a memory device 240. The network system 206 comprises computer-readable instructions 242 stored in the memory device 240, which in one embodiment includes the computer-readable instructions 242 of a network application 244.

It is understood that the servers, systems, and devices described herein illustrate one embodiment of the invention. It is further understood that one or more of the servers, systems, and devices can be combined in other embodiments and still function in the same or similar way as the embodiments described herein.

FIG. 2 provides a high level process flow illustrating the permanent affixing of the identifier to a mobile device 100, in accordance with one embodiment of the present invention. As illustrated in block 102, the process 100 is initiated by receiving a user selected identifier. In this way, the system may provide the user, via the user device, with one or more options for the identifier. These options may include an application, widget, picture, contact, video, meme, or the like that may be used as an identifier. In some embodiments, the application, widget, picture, contact, video, meme, or the like may already be on the user device. In some embodiments, the application, widget, picture, contact, video, meme, or the like may be taken or downloaded by the user. In yet other embodiments, the application, widget, picture, contact, video, meme, or the like may be provided to the user by the system.

The system may provide the user with options for the identifier via a user interface presented to the user via the user device. In some embodiments, the user interface may be a part of the start-up screen associated with the device upon starting the device for the first time.

Next, as illustrated in block 104, the process 100 continues after receiving the users selected identifier by coding the identifier for the user device including an un-decryptable code and a beacon code. The un-decrytable code may allow the identifier to be maintained on the user device even after a complete wipe out, deletion, or clearing of all the data on the device. However, the un-decryptable code may be altered, changed, or deleted by the user or the system upon authorization by the user. The beacon code may include a secure communicable link generated via the code to transmit a location of the user device upon request or automatically based on an identification of deletion of data on the user device.

Once coded, the system may provide the coded identifier to the user device, as illustrated in block 106. Once provided, the system may integrate and store the identifier on the user device permanently affixing the identifier into the user device. As illustrated in block 108, the stored coded identifier is permanently affixed to the user device based on an authorization of storage by the user. The identifier may be stored and integrated into the user device. As such, if the identifier is a picture, it may be stored with the user's photos. Likewise, if the identifier is an application or widget, the identifier may be stored with the widgets and/or applications. Furthermore, the coded identifier may still perform the functions originally provided by the identifier. Thus, for example, if the identifier is an application for playing music, once that identifier has been coded by the system and presented back on the user device for permanent storage, the identifier may still perform the functionality of the application, such that it may still play music in the same or similar way it did prior to being coded by the system.

FIG. 3 provides a process map illustrating identifying and coding an identifier 300, in accordance with one embodiment of the present invention. As illustrated in block 302, the process 300 is initiated by identifying one or more potential identifiers on the user device. In this way, the system may identify a picture, widget, application, or the like that may be coded as an identifier. In some embodiments, the object that will become the identifier is already stored on the user device. In other embodiments, the system may provide the object that will become the identifier to the user device.

Once the objects are identified as being potential identifiers, the process 300 continues by presenting a list of the potential identifiers to the user via the user device, as illustrated in block 304. The presentation of the identifiers allows the user to select an identifier from the list of potential identifier objects, as illustrated in block 306. In some embodiments, the user may supply the system with the object for the identifier. In some embodiments, the system may select objects from the user device that may be used as the identifier. In some embodiments, the system may supply one or more objects to the user as potential identifiers.

Once the objects are provided to the user, the system may receive an authorized selection of the object the user wishes to use as the identifier for the user device, as illustrated in block 308. As such, the system may require authorization to confirm that the user is the one providing the identifier to the system for use. As such, the user may be authorized and confirmed to be authorized to provide the identifier for the user device. In some embodiments, the system may confirm that the user providing the identifier is the owner of the device via communication with the service provider associated with the user device.

Finally, once the identifier is received from an authorized user and the system confirms that the mobile device is associated with the user, the system may continue by coding the identifier and providing the identifier to the user, as illustrated in block 310. The coding of the identifier for the user device includes an un-decryptable code and a beacon code. The un-decryptable code may allow the identifier to be maintained on the user device even after a complete wipe out, deletion, or clearing of all the data on the device. However, the un-decryptable code may be altered, changed, or deleted by the user or the system upon authorization by the user. The beacon code may include a secure communicable link generated via the code to transmit a location of the user device upon request or automatically based on an identification of deletion of data on the user device.

As further illustrated in block 310, the system may require a user authentication to allow the identifier to be permanently affixed to the user device. Once permanently affixed, any applications that may allow for wiping, cleaning, or deleting of data may not have the ability to delete the identifier. In some embodiments, the identifier is permanently affixed to the user device. In other embodiments, the identifier is affixed until the user presents authorization to remove the identifier.

FIG. 4 illustrates a process map for the storing and activating of the identifier on a mobile device 400, in accordance with one embodiment of the present invention. The process 400 is initiated by storing the identifier on the user device, as illustrated in block 402. In some embodiments, this storage is a permanent storage of the identifier on the user device. In other embodiments, the identifier can only be removed from the device with a user request and authorization. Once the user has authorized the installation of the identifier onto the user device, the identifier, in whatever form, maybe affixed to the user device. The identifier may be stored with similar objects, such as applications, widgets, contacts, pictures, or the like within the mobile device of the user. Furthermore, the identifier may be stored within the memory of the user device. Upon storage, the system may continue to maintain the identifier on the user device, as illustrated in block 404. As such, any updates to the code that may need to be performed, may be performed by the system and implemented onto the identifier on the user device.

Next, as illustrated in block 406, the system may recognize misappropriation or a misplacement of the user device. In some embodiments, the user may notify the system of the misappropriation or misplacement of the user device. In some embodiments, the system may automatically identify the misappropriation based on an invalid attempt to delete or erase the identifier.

Once the misappropriation or misplacement of the user device has been identified, the system may continue by activating the identifier beacon, as illustrated in block 408. In some embodiments, the user may initiate the activation of the identifier beacon. As such, the user may activate the beacon remotely via secure communicable link. The user may provide a passcode, number, or other identification type that may transmit a signal to the identifier to activate the beacon. In other embodiments, the system may activate the beacon associated with the identifier. The system may activate the beacon associated with the identifier based on a recognition that there was an attempted deletion of the identifier without user or system authorization. In some embodiments, the system may activate the beacon based on an identification of changing of the applications or contacts associated with the device. In yet other embodiments, the system may activate the beacon based on global positioning system information associated with the device. The beacon provides a location of the user device. The location may be utilized by the user to retrieve his/her device.

Finally, as illustrated in block 410, the identifier may also include code that may be activated to remove other desired information for the user device via the secure communicable link. In this way, if the user has one or more contacts, applications, passwords, or the like that he/she wishes to remain private after misappropriation or misplacement of the user device, the activation of the identifier may allow for the user to erase or delete this private information from the device remotely.

FIG. 5 provides a detailed system process flow illustrating data flow of the un-decryptable identifier system 500, in accordance with one embodiment of the present invention. As illustrated, the systems associated with the system environment 200 include the user device 204, the application server 208, and the network systems 206. The process is initiated when the user, via the user device 204 provides a request for the system and authorizes that the user is the one making the request, as illustrated in block 504. The process 500 then continues by sending that request via a secure communicable link to the application server 208. The application server 208 may then, upon receiving the request, generate a request for an identifier via a user interface, as illustrated in block 502. The request may also include a request to the network system 206 for application information on the user device 204, as illustrated in block 510. The network system 206 may identify the applications associated with the user device 204 and present that application to the application server 208, as illustrated in block 511. Once identified and presented, the application server 208 may then communicate the identifiers to the user device 204 for the user to select. These identifiers may be objects such as applications, widgets, contacts, communications, or the like. The user may be presented to the user via a user interface via the user device 204.

Next, as illustrated in block 506, the process continues by the user sending the selected identifier from the user device 204 to the application server 208. Next, once the selection is received, the application server 208 may code the identifier with the beacon code, un-decryptable code, and the remote delete code, as illustrated in block 508. Along with coding of the identifier, the network system 206 may provide information associated with applications that the user may desire to be deleted or cleared upon misappropriation, as illustrated in block 512. Once coded with the un-decryptable code, the beacon code, and the remote deletion code, the application server 208 may, in some embodiments, then send the coded object in the form of an identifier may send the identifier for permanent storage on the user device 204, as illustrated in block 514.

Once the identifier is sent for permanent storage, the user device 204 may permanently store the identifier in the user device 204, as illustrated in block 516. The storage may occur based on user authentication for the permanent storage.

In some embodiments, once the identifier is permanently stored on the device, the application service 208 may receive an indication of misplaced or misappropriated user device, as illustrated in block 518. In some embodiments, the user may provide the application server 208 with the indication of the misplaced or misappropriated user device. In other embodiments, the application server 208 may identify the misplacement or misappropriation of the user device.

Once the indication of the misplaced or misappropriated user device is identified by the application server 208, the application server 208 may send a secure communication link to the identifier on the user device 204 to activate the beacon and/or the applications desired by the user, as illustrated in block 520.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function. As such, once the software and/or hardware of the claimed invention is implemented the computer device and application-specific circuits associated therewith are deemed specialized computer devices capable of improving technology associated with the in authorization and instant integration of a new credit card to digital wallets.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a special purpose computer for the authorization and instant integration of credit cards to a digital wallet, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

INCORPORATION BY REFERENCE

To supplement the present disclosure, this application further incorporates entirely by reference the following commonly assigned patent applications:

| U.S. patent application Ser. No. | Title | Filed On |
| --- | --- | --- |
| 14/928,332 | DETERMINING USER AUTHENTICATION BASED ON USER/DEVICE INTERACTION | Concurrently herewith |
| 14/928,360 | DETERMINING USER AUTHENTICATION BASED ON USER PATTERNS WITHIN APPLICATION | Concurrently herewith |
| 14/928,154 | PASSIVE BASED SECURITY ESCALATION TO SHUT OFF OF APPLICATION BASED ON RULES EVENT TRIGGERING | Concurrently herewith |
| 14/928,498 | INTEGRATED FULL AND PARTIAL SHUTDOWN APPLICATION PROGRAMMING INTERFACE | Concurrently herewith |
| 14/928,392 | TIERED IDENTIFICATION FEDERATED AUTHENTICATION NETWORK SYSTEM | Concurrently herewith |

What is claimed is:

1. A system for creating and storing an un-decryptable identifier on a mobile device, the system comprising:
a memory device with computer-readable program code stored thereon;
a communication device;
a processing device operatively coupled to the memory device and the communication device, wherein the processing device is configured to execute the computer-readable program code to:
receive a request and authorization from a user to generate the identifier on the mobile device of the user;
present one or more objects to the user that can be coded as the identifier, wherein the one or more objects presented have an original function associated with each of the one or more objects;
receive a selected object from the user, wherein the selected object is selected to be the identifier;
code the selected object allowing the identifier to be maintained on the mobile device after a complete wipe out, deletion, or clearing of all the data on the mobile device, wherein coding comprises coding the selected object with a beacon code, and a remote deletion code to become the identifier, wherein coding the selected object further comprises maintaining the original function of the selected object;
transmit the identifier to the mobile device associated with the user;
store, upon user authorization, the identifier on the mobile device, wherein storing further comprises integrating the identifier into storage with like objects;
identify misplacement or misappropriation of the mobile device; and
activate, based on identifying the misplacement or the misappropriation of the mobile device, the beacon code for identifying a location of the mobile device.

2. The system of claim 1, wherein the beacon code comprises a location beacon that creates a secure communicable link to transmit a location of the mobile device, wherein the beacon code is activated upon an identification of an attempted deletion of the identifier.

3. The system of claim 1, wherein the remote deletion code comprises code that allows the user to connect remotely to the mobile device and allows for remote deletion one or more personal items from the mobile device.

4. The system of claim 1, wherein identifying misplacement or misappropriation of the mobile device further comprises automatically identifying misplacement of the mobile device based on inactivity of the identifier and automatically identifying misappropriation of the mobile device by identifying an attempt to delete the identifier.

5. The system of claim 1, wherein the one or more objects that can be coded as the identifier include applications, widgets, pictures, or contacts associated with the mobile device of the user.

6. The system of claim 1, further comprising accessing the mobile device of the user and extracting applications, widgets, pictures, and contacts that can be coded as the identifier.

7. The system of claim 1, wherein storing the identifier on the mobile device further comprises permanently affixing the identifier on the mobile device, wherein storing further comprises integrating the identifier into storage with like objects on the mobile device.

8. A computer program product for creating and storing an un-decryptable identifier on a mobile device, the computer program product comprising at least one non-transitory computer-readable medium having computer-readable program code portions embodied therein, the computer-readable program code portions comprising:
an executable portion configured for receiving a request and authorization from a user to generate the identifier on the mobile device of the user;
an executable portion configured for presenting one or more objects to the user that can be coded as the identifier, wherein the one or more objects presented have an original function associated with each of the one or more objects;
an executable portion configured for receiving a selected object from the user, wherein the selected object is selected to be the identifier;
an executable portion configured for coding the selected object allowing the identifier to be maintained on the mobile device after a complete wipe out, deletion, or clearing of all the data on the mobile device, wherein coding comprises coding the selected object with a beacon code, and a remote deletion code to become the identifier, wherein coding the selected object further comprises maintaining the original function of the selected object;
an executable portion configured for transmitting the identifier to the mobile device associated with the user;
an executable portion configured for storing, upon user authorization, the identifier on the mobile device, wherein storing further comprises integrating the identifier into storage with like objects;
an executable portion configured for identifying misplacement or misappropriation of the mobile device; and an executable portion configured for activating, based on identifying the misplacement or the misappropriation of the mobile device, the beacon code for identifying a location of the mobile device.

9. The computer program product of claim 8, wherein the beacon code comprises a location beacon that creates a secure communicable link to transmit a location of the mobile device, wherein the beacon code is activated upon an identification of an attempted deletion of the identifier.

10. The computer program product of claim 8, wherein the remote deletion code comprises code that allows the user to connect remotely to the mobile device and allows for remote deletion one or more personal items from the mobile device.

11. The computer program product of claim 8, wherein identifying misplacement or misappropriation of the mobile device further comprises automatically identifying misplacement of the mobile device based on inactivity of the identifier and automatically identifying misappropriation of the mobile device by identifying an attempt to delete the identifier.

12. The computer program product of claim 8, wherein the one or more objects that can be coded as the identifier include applications, widgets, pictures, or contacts associated with the mobile device of the user.

13. The computer program product of claim 8, further comprising an executable portion configured for accessing the mobile device of the user and extracting applications, widgets, pictures, and contacts that can be coded as the identifier.

14. The computer program product of claim 8, wherein storing the identifier on the mobile device further comprises permanently affixing the identifier on the mobile device, wherein storing further comprises integrating the identifier into storage with like objects on the mobile device.

15. A computer-implemented method for creating and storing an un-decryptable identifier on a mobile device, the method comprising:
  providing a computing system comprising a computer processing device and a non-transitory computer readable medium, where the computer readable medium comprises configured computer program instruction code, such that when said instruction code is operated by said computer processing device, said computer processing device performs the following operations:
  receiving a request and authorization from a user to generate the identifier on the mobile device of the user;
  presenting one or more objects to the user that can be coded as the identifier, wherein the one or more objects presented have an original function associated with each of the one or more objects;
  receiving selected object from the user, wherein the selected object is selected to be the identifier;
  coding the selected object allowing the identifier to be maintained on the mobile device after a complete wipe out, deletion, or clearing of all the data on the mobile device, wherein coding comprises coding the selected object with a beacon code, and a remote deletion code to become the identifier, wherein coding the selected object further comprises maintaining the original function of the selected object;
  transmitting the identifier to the mobile device associated with the user;
  storing, upon user authorization, the identifier on the mobile device, wherein storing further comprises integrating the identifier into storage with like objects;
  identifying misplacement or misappropriation of the mobile device; and
  activating, based on identifying the misplacement or the misappropriation of the mobile device, the beacon code for identifying a location of the mobile device.

16. The computer-implemented method of claim 15, wherein the beacon code comprises a location beacon that creates a secure communicable link to transmit a location of the mobile device, wherein the beacon code is activated upon an identification of an attempted deletion of the identifier.

17. The computer-implemented method of claim 15, wherein the remote deletion code comprises code that allows the user to connect remotely to the mobile device and allows for remote deletion one or more personal items from the mobile device.

18. The computer-implemented method of claim 15, wherein identifying misplacement or misappropriation of the mobile device further comprises automatically identifying misplacement of the mobile device based on inactivity of the identifier and automatically identifying misappropriation of the mobile device by identifying an attempt to delete the identifier.

19. The computer-implemented method of claim 15, wherein the one or more objects that can be coded as the identifier include applications, widgets, pictures, or contacts associated with the mobile device of the user.

20. The computer-implemented method of claim 15, wherein storing the identifier on the mobile device further comprises permanently affixing the identifier on the mobile device, wherein storing further comprises integrating the identifier into storage with like objects on the mobile device.

* * * * *